(12) United States Patent
Sakai et al.

(10) Patent No.: US 10,274,313 B2
(45) Date of Patent: Apr. 30, 2019

(54) MEASUREMENT METHOD AND MEASUREMENT PROGRAM FOR CALCULATING ROUGHNESS OF A CURVED SURFACE

(71) Applicant: MITUTOYO CORPORATION, Kanagawa (JP)

(72) Inventors: Hiroshi Sakai, Kanagawa (JP); Yutaka Watanabe, Kanagawa (JP); Yasuhiro Takahama, Kanagawa (JP); Harumasa Ito, Tokyo (JP); Yuji Kudo, Kanagawa (JP)

(73) Assignee: MITUTOYO CORPORATION, Kanagawa (JP)

( * ) Notice: Subject to any disclaimer, the term of this patent is extended or adjusted under 35 U.S.C. 154(b) by 165 days.

(21) Appl. No.: 15/440,118

(22) Filed: Feb. 23, 2017

(65) Prior Publication Data

US 2017/0248410 A1     Aug. 31, 2017

(30) Foreign Application Priority Data

Feb. 25, 2016  (JP) .................................. 2016-034826
Dec. 20, 2016  (JP) .................................. 2016-246802

(51) Int. Cl.
  *G01B 11/24*   (2006.01)
  *G01B 11/30*   (2006.01)
  (Continued)

(52) U.S. Cl.
  CPC .......... *G01B 11/2441* (2013.01); *G01B 11/14* (2013.01); *G01B 11/303* (2013.01); *G01B 21/04* (2013.01); *G01B 2210/52* (2013.01)

(58) Field of Classification Search
  CPC .............. G01B 9/02029; G01B 9/0203; G01B 11/2441; G01B 11/303; G01B 2210/52;
  (Continued)

(56) References Cited

U.S. PATENT DOCUMENTS 5,166,820 A     11/1992  Fujita
5,237,404 A *   8/1993   Tanaka ................. G01B 11/303
                                                          348/128
(Continued)

FOREIGN PATENT DOCUMENTS

JP     2011-191118     9/2011
JP     2015-045575     3/2015
JP     2015-118076     6/2015

OTHER PUBLICATIONS

U.S. Appl. No. 15/439,019 to Hiroshi Sakai et al., which was filed on Feb. 22, 2017.
(Continued)

*Primary Examiner* — Michael A Lyons
(74) *Attorney, Agent, or Firm* — Greenblum & Bernstein, P.L.C.

(57) ABSTRACT

According to an embodiment of the present invention, a method of measuring a surface of an object having a curved shape by measuring a distance from a measurement head to the object, includes: setting a measuring region of the object and a threshold value of concave and convex; acquiring shape reference data including the curved shape of the object; acquiring three-dimensional data of the surface of the object by measuring the distance between the object in the measuring region and the measurement head; acquiring curve removed data by removing the shape reference data from the three-dimensional data; calculating second reference data by calculating first reference data based on the curve removed data, by removing data exceeding the threshold value with respect to the first reference data, from the curve removed data, and by averaging the curve removed data; and calculating shape data of the concave and convex.

7 Claims, 9 Drawing Sheets

(51) Int. Cl.
*G01B 11/14* (2006.01)
*G01B 21/04* (2006.01)

(58) Field of Classification Search
CPC ............. G01N 21/892; G01N 21/8922; G01N 2021/8924; G01N 21/9515
See application file for complete search history.

(56) References Cited

U.S. PATENT DOCUMENTS

| | | | |
|---|---|---|---|
| 5,400,132 | A | 3/1995 | Trepagnier |
| 5,471,303 | A | 11/1995 | Ai et al. |
| 8,891,090 | B2 | 11/2014 | Nagahama et al. |
| 2004/0240754 | A1 | 12/2004 | Smith et al. |
| 2006/0146342 | A1* | 7/2006 | Doerband .......... G01B 11/2441 356/512 |
| 2006/0215177 | A1* | 9/2006 | Doerband .......... G01B 11/2509 356/609 |
| 2011/0222069 | A1 | 9/2011 | Nagahama et al. |
| 2013/0188198 | A1 | 7/2013 | Suenaga |
| 2014/0152794 | A1* | 6/2014 | Takahashi .............. G01B 11/24 348/79 |
| 2014/0283591 | A1* | 9/2014 | Takahashi ............ G01B 11/245 73/146 |
| 2015/0176967 | A1* | 6/2015 | Okabe ................ G01B 9/02077 356/511 |
| 2017/0178980 | A1* | 6/2017 | Owen ................ G01B 11/2441 |

OTHER PUBLICATIONS

U.S. Office Action issued for U.S. Appl. No. 15/439,019 dated Mar. 29, 2018.

* cited by examiner

MEASUREMENT METHOD AND MEASUREMENT PROGRAM FOR CALCULATING ROUGHNESS OF A CURVED SURFACE

CROSS-REFERENCE TO RELATED APPLICATION

This non-provisional application claims priority under 35 U.S.C. § 119(a) from Japanese Patent Application No. 2016-034826, filed on Feb. 25, 2016, and Japanese Patent Application No. 2016-246802, filed on Dec. 20, 2016, the entire contents of which are incorporated herein by reference.

BACKGROUND

Technical Field

The present invention relates to a measurement method and a measurement program. More specifically, the invention relates to a measurement method and a measurement program, for precisely measuring the surface height of a curved object.

Related Art

Light interferometry that uses brightness information of interference fringes occurring due to optical interference, has been known as a method of measuring the surface height, the surface roughness, and the three-dimensional shape of a measuring object. The light interferometry uses an increase of the brightness of interference fringes due to superposition and composition of peaks of the interference fringes between wavelengths at a focus at which the optical path length of a reference optical path and the optical path length of a measurement optical path correspond to each other. Therefore, an image pickup element, such as a CCD camera, captures an interference image indicating a two-dimensional distribution of the intensity of interference light, with the optical path length of the reference optical path or the measurement optical path, being varied, in the light interferometry. By detecting a focused position at which the intensity of the interference light has a peak at the respective measurement positions within a capturing field of view, it is possible to measure the height of a measurement surface in a corresponding measurement position and thus a three-dimensional shape or the like of the measuring object (e.g., refer to JP 2011-191118 A, JP 2015-045575 A, and JP 2015-118076 A).

SUMMARY OF THE INVENTION

However, when the surface of the measuring object is curved, the state of concave and convex of the surface and the surface roughness are difficult to measure precisely because a measurement value includes the state of the curve of the surface. Particularly, when the measuring object is a face of a cylindrical inner wall (e.g., a face of an inner wall of a cylinder), conventionally, a part of the face of the inner wall is transferred to a replica agent and then a transferred shape is manually analyzed with a laser microscope. In the manual analysis, the bias of the reliability of examination or a bias resulting from an examiner increases.

An objective of the present invention is to provide a measurement method and a measurement program, capable of automatically, precisely measuring a surface of a curved object.

In order to solve the problem, according to an embodiment of the present invention, a method of measuring a surface of an object having a curved shape by measuring a distance from a measurement head to the object, includes: setting a measuring region of the object and a threshold value of concave and convex; acquiring shape reference data including the curved shape of the object; acquiring three-dimensional data of the surface of the object by measuring the distance between the object in the measuring region and the measurement head; acquiring curve removed data by removing the shape reference data from the three-dimensional data; calculating second reference data by calculating first reference data based on the curve removed data, by averaging the data removing data exceeding the threshold value with respect to the first reference data, from the curve removed data, and by averaging the curve removed data from which the data exceeding the threshold value is removed; and calculating shape data of the concave and convex by extracting data exceeding the threshold value with respect to the second reference data, from the curve removed data.

With this configuration, the shape reference data including the curved shape is removed from the acquired three-dimensional data of the surface of the object having the curved shape so that the data excluding a curve shape of the surface of the object (the curve removed data) can be acquired. The data exceeding the threshold value with respect to the first reference data based on the curve removed data, is removed so that the second reference data excluding the concave and convex of the surface can be acquired. The threshold-value determination is made again with respect to the second reference data so that the measurement including the determination of the concave and convex can be precisely performed.

The measurement method according to the embodiment of the present invention, may further include calculating the surface roughness of the object by using data excluding the data exceeding the threshold value with respect to the second reference data, from the curve removed data. Accordingly, the surface roughness excluding the curved shape and the concave and convex, can be calculated.

In the measurement method according to the embodiment of the present invention, the shape data of the concave and convex may include at least one of the area size, the area ratio, the volume, a maximum value of openings, a minimum value of the openings, and an average value of the openings, of the concave and convex. The surface of the object may be an inner face of any of a cylinder, a cone, an elliptical cylinder and an elliptical cone. The measurement head may measure the distance by light interferometry.

According to the embodiment of the present invention, a non-transitory computer-readable recording medium that stores a measurement program for measuring a surface state of an object having a curved shape by measuring a distance from a measurement head to the object, when executed by a computer causes the computer to function as: a unit configured to set a measuring region of the object and a threshold value of concave and convex; another unit configured to acquire shape reference data including the curved shape of the object; another unit configured to measure the distance between the object in the measuring region and the measurement head, and configured to acquire three-dimensional data of the surface of the object; another unit configured to remove the shape reference data from the three-dimensional data, and configured to acquire curve removed data; another unit configured to calculate first reference data based on the curve removed data, configured to remove data exceeding the threshold value with respect to the first reference data, from the curve removed data, configured to average the curve removed data from which the data exceeding the threshold value is removed, and configured to calculate a second reference data; and another unit configured to extract data exceeding the threshold value with respect to the second reference data, from the curve removed data, and configured to calculate shape data of the concave and convex.

With this configuration, the computer acquires the data excluding the curved shape from the acquired three-dimensional data of the surface of the object (the curve removed data), and performs the processing of removing the data exceeding the threshold value with respect to the first reference data based on the curve removed data. Accordingly, it is possible to acquire the second reference data excluding the concave and convex of the surface. The threshold-value determination is made again with respect to the second reference data so that a measurement result including the determination of the concave and convex can be precisely calculated.

DETAILED DESCRIPTION OF THE EMBODIMENTS

An embodiment of the present invention will be described below based on the drawings. Note that, the same members are denoted with the same reference signs and the descriptions of members that have been described once will be appropriately omitted, in the following descriptions.

(Entire Configuration of Measurement Apparatus)

Figure 1:
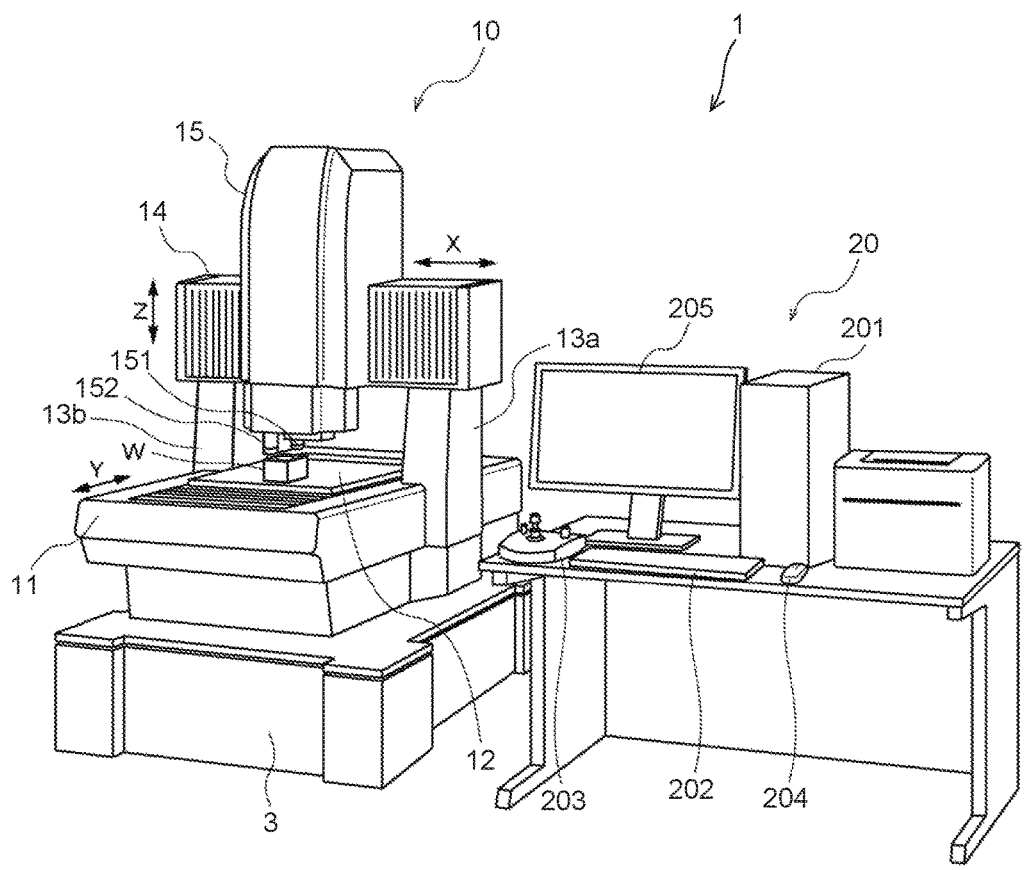
FIG. 1 is a view of an entire configuration of an image measurement apparatus according to the present embodiment.

FIG. 1 is a view of a measurement apparatus according to the present embodiment, more specifically, an entire configuration of an image measurement apparatus.

As illustrated in FIG. 1, the image measurement apparatus 1 according to the present embodiment includes an apparatus body 10 that measures the shape of an object W, and a computer system 20 that controls the apparatus body 10 and additionally performs necessary data processing. Note that, the image measurement apparatus 1 may appropriately include, for example, a printer that prints a measurement result, other than the body and the system. The image measurement apparatus 1 according to the present embodiment is suitable for the measurement of the object W having a curved shape, such as an inner wall of a cylinder.

The apparatus body 10 includes a mount 11, a stage 12, an X-axis guide 14, and an imaging unit 15. According to the present embodiment, a direction of an X-axis (a direction along the X-axis) is one direction along a face of the stage 12. A direction of a Y-axis (a direction along the Y-axis) is along the face of the stage 12 and is orthogonal to the direction of the X-axis. A direction of a Z-axis (a direction along the Z-axis) is orthogonal to the direction of the X-axis and the direction of the Y-axis. The direction of the Z-axis is also referred to as an upper and lower direction. The direction of the X-axis and the direction of the Y-axis each are also referred to as a horizontal direction.

The mount 11 is, for example, arranged on an vibration isolation table 3 so that external vibrations are inhibited from being transmitted to the stage 12 and the imaging unit 15 on the mount 11. The stage 12 is arranged on the mount 11. The stage 12 is mounted with the measuring object W. The stage 12 is provided movable in the direction of the Y-axis to the mount 11 due to a Y-axis driving mechanism not illustrated.

Supporting portions 13a and 13b are provided to both side portions of the mount 11. The respective supporting portions 13a and 13b are provided so as to extend upward from the side portions of the mount 11. The X-axis guide 14 is provided on the supporting portions 13a and 13b so as to be astride the portions. The X-axis guide 14 includes the imaging unit 15 mounted.

The imaging unit 15 is provided movable in the direction of the X-axis along the X-axis guide 14 due to an X-axis driving mechanism not illustrated, and is provided movable in the direction of the Z-axis by a Z-axis driving mechanism. The relative positional relationship between the object W on the stage 12 and the imaging unit 15, along the X-axis, the Y-axis, and the Z-axis, can be set due to the driving mechanisms. That is, the positional relationship is adjusted so that an imaging area of the imaging unit 15 can correspond to a measuring region of the object W.

The imaging unit 15 is provided, in a removable manner, with an image optical head 151 that images a two-dimensional image of the object W and a light interference optical head 152 that measures a three-dimensional shape of the object W the light interference measurement. The imaging unit 15 measures the object, at a measurement position set by the computer system 20, using either head.

The measurement field of view of the image optical head 151 is typically set wider than the measurement field of view of the light interference optical head 152, and both of the heads can be used, being switched due to the control of the computer system 20. The image optical head 151 and the light interference optical head 152 are supported by a common supporting plate so as to retain a certain positional relationship, and are previously calibrated in order to prevent measurement coordinate axes from varying before and after the switching.

The image optical head 151 includes, for example, a CCD camera, an illustrating device, and a focusing mechanism, and captures the two-dimensional image of the object W. The computer system 20 captures data of the two-dimensional image that has been captured.

The light interference optical head 152 measures the shape of the object W, for example, due to white-light interferometry. According to the present embodiment, the light interference optical head 152 is an exemplary measurement head. The details of the light interference optical head 152 will be described later.

The computer system 20 includes a computer main body 201, a keyboard 202, a joystick 203, a mouse 204, and a display 205. The computer main body 201 controls, for example, the operation of the apparatus body 10. The computer main body 201 controls the operation of the apparatus body 10 with a circuit (hardware), such as a control board, and a program (software) executed by a CPU. The computer main body 201 operates information on the object W, based on a signal output from the apparatus body 10, and displays an operation result on the display 205.

The joystick 203 is used in setting a position at which the image of the object W is captured. That is, a user operates the joystick 203 so that the relative positional relationship between the object W and the imaging unit 15 varies and the position of the imaging area displayed on the display 205 can be adjusted.

Figure 2:
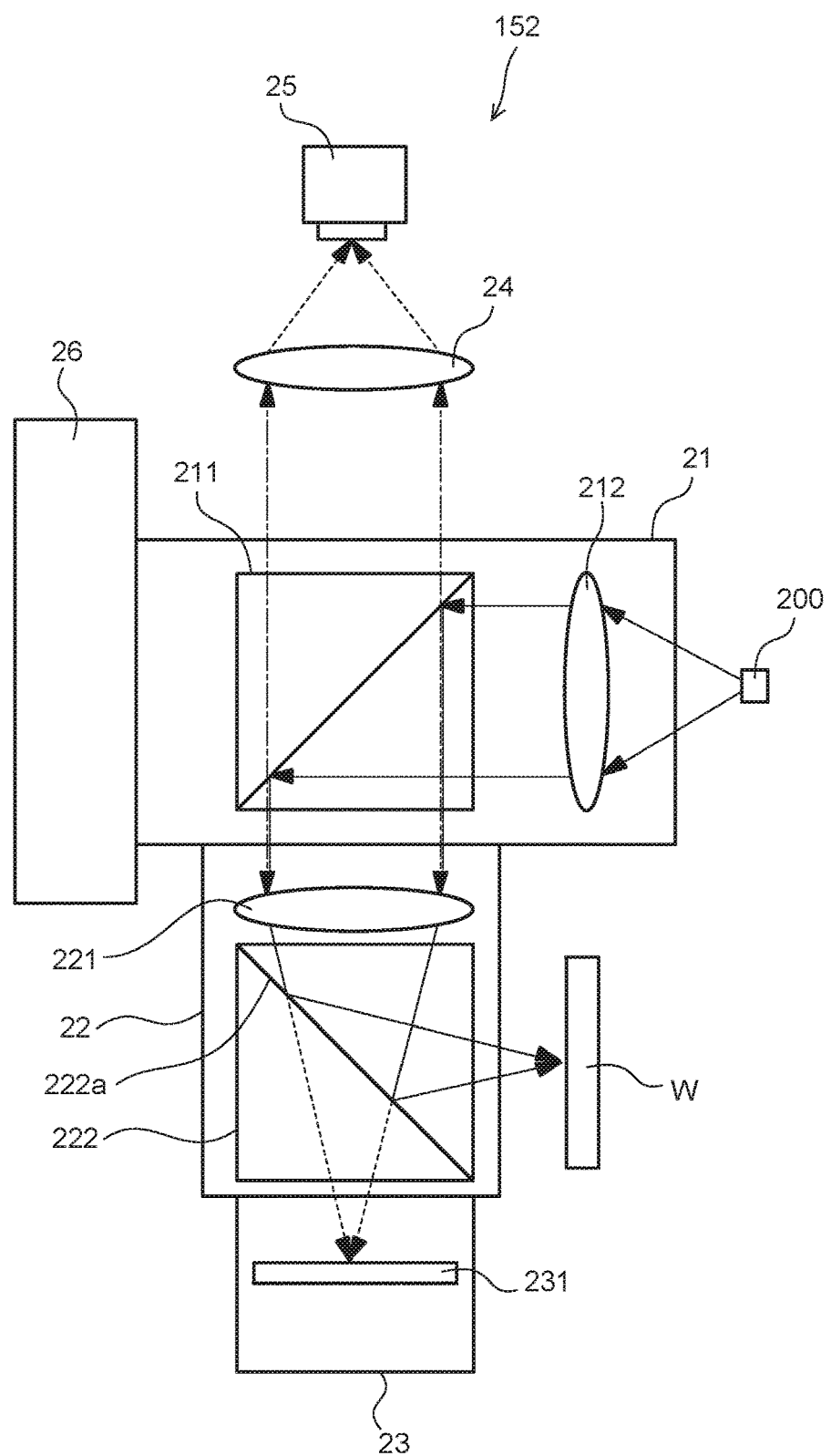
FIG. 2 is a schematic view exemplifying a configuration of a light interference optical head.

FIG. 2 is a schematic view exemplifying a configuration of the light interference optical head.

As illustrated in FIG. 2, the light interference optical head 152 includes a light emitting unit 200, a light interference optical head unit 21, an objective lens unit 22, a reference mirror unit 23, an image-forming lens 24, an imaging unit 25, and a driving mechanism unit 26.

The light emitting unit 200 includes a light source that outputs low coherence broadband light having a number of wavelength components over a broadband. A white light source, such as a halogen lamp or a light emitting diode (LED), is used as the light emitting unit 200.

The light interference optical head unit 21 includes a beam splitter 211 and a collimator lens 212. The light emitted from the light emitting unit 200 is delivered in a collimated manner to the beam splitter 211 via the collimator lens 212, from a direction perpendicular to the optical axis of the objective lens unit 22. From the beam splitter 211, light is output along such optical axis and the collimated beam is delivered from above to the objective lens unit 22.

The objective lens unit 22 includes, for example, an objective lens 221 and a beam splitter 222. When the collimated beam is incident on the objective lens 221 in the objective lens unit 22 from the upper side, the incident light becomes convergent light due to the objective lens 221, and the convergent light is incident on a reflection plane 222a inside the beam splitter 222. Here, the incident light is divided into transmitted light (reference light) that travels in a reference optical path (a broken line in the figure) having a reference mirror 231, and reflected light (measurement light) that travels in a measurement optical path (a solid line in the figure) including the object W arranged. The transmitted light converges, is reflected from the reference mirror 231, and further is transmitted through the reflection plane 222a of the beam splitter 222. Meanwhile, the reflected light converges, is reflected from the object W, and is reflected from the reflection plane 222a of the beam splitter 222. The reflected light from the reference mirror 231 and the reflected light from the object W are composited by the reflection plane 222a of the beam splitter 222 so as to be a composite wave.

The composite wave composited at a position of the reflection plane 222a of the beam splitter 222, becomes a collimated beam due to the objective lens 221. Then, the collimated beam travels upward and is incident on the image-forming lens 24 after passing through the light interference optical head unit 21 (a dot-and-dash line in FIG. 2). The image-forming lens 24 focuses the composite wave so as to form an interference image on the imaging unit 25.

The reference mirror unit 23 retains the reference mirror 231 that reflects the transmitted light (the reference light) that has been branched by the beam splitter 222 and travels in the reference optical path. When the object W is the inner wall of the cylinder, a face of the inner wall is arranged substantially vertical to the stage 12. Accordingly, the convergent light due to the objective lens 221 is orthogonally reflected by the beam splitter 222 (in the horizontal direction), and then the face of the inner wall of the cylinder vertically arranged is irradiated with the measurement light.

The imaging unit 25 is, for example, a CCD camera including a two-dimensional image pickup element for constituting an image pickup means, and captures the interference image of the composite wave (the reflected light from the object W and the reflected light from the reference mirror 231) output from the objective lens unit 22. The computer system 20 captures data of the image that has been captured.

Figure 3:
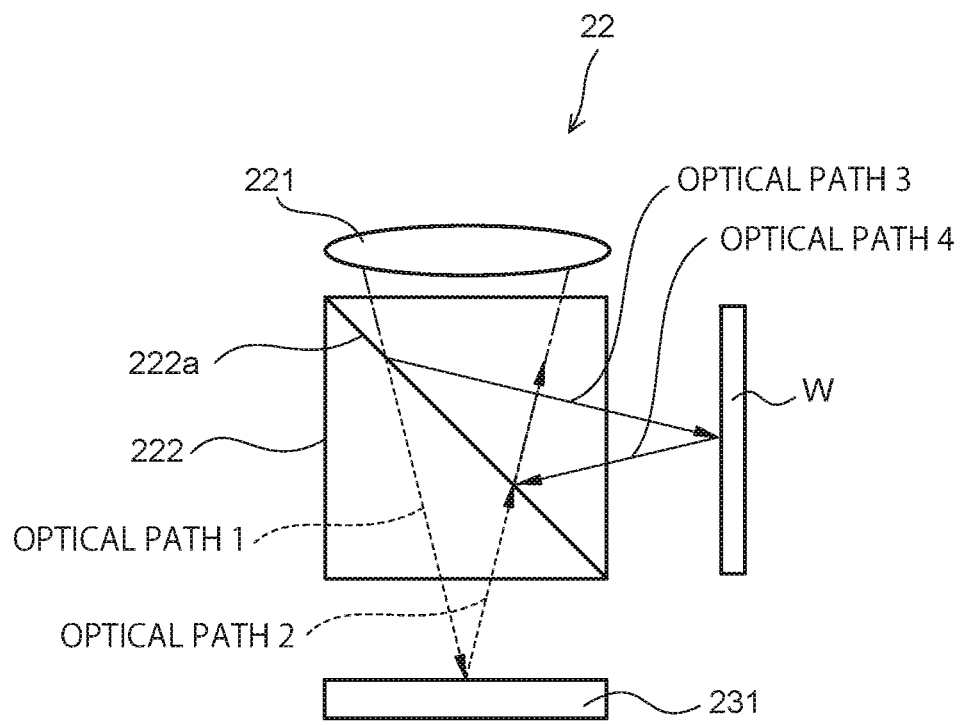
FIG. 3 is an enlarged view of a main portion of an objective lens portion.

The driving mechanism unit 26 moves the light interference optical head 152 in a direction of the optical axis in accordance with a command for movement, from the computer system 20. Here, in an enlarged view of a main portion of the objective lens unit 22 illustrated in FIG. 3, when the optical path length of the reference optical path (an optical path 1+an optical path 2) and the optical path length of the measurement optical path (an optical path 3+an optical path 4) are equivalent to each other, the optical path length difference becomes zero. Therefore, the driving mechanism unit 26 horizontally moves the light interference optical head 152 in a direction of the optical axis of a beam reflected by the beam splitter 222 so as to adjust the length of the measurement optical path in order to acquire an optical path length difference of zero, in the measurement. Note that, a case where the light interference optical head 152 is moved, has been exemplarily described above, but a configuration in which the length of the measurement optical path is adjusted by moving the stage 12, may be provided. In this manner, the optical path length of any one of the reference optical path and the measurement optical path is variable in the light interference optical head 152. Note that, when a measurement surface of the object W is arranged in the horizontal direction, an optical system that transmits the measurement light in a vertical direction by inverting the transmission of the reference light and the reflection of the measurement light due to the beam splitter 222, may be applied.

The imaging unit 25 repeatedly captures images with the position of the light interference optical head 152 in the direction of the optical axis, being moved and scanned by the driving mechanism unit 26, under the control of the computer system 20. The computer system 20 captures image data of the interference image captured by the imaging unit 25 at each moving and scanning position. A moving and scanning position at which a peak of interference fringes occurs, is detected at each position in the measurement field of view so that the height of the measurement surface of the object W is acquired at each of the positions.

Figure 4A:
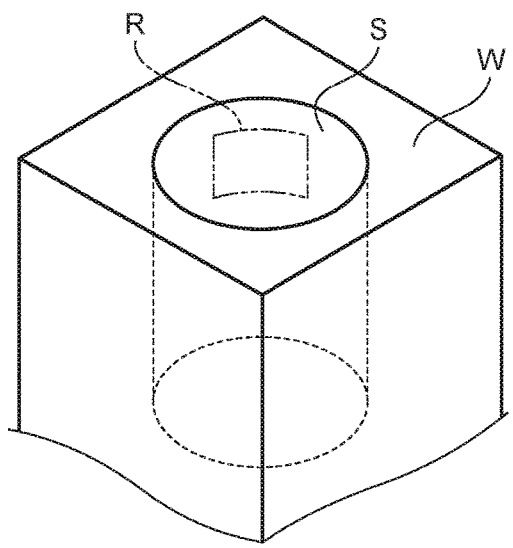
FIG. 4A is a schematic perspective view exemplifying an object having a curved shape.
Figure 4B:
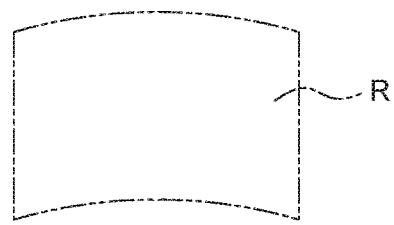
FIG. 4B is a schematic view exemplifying a measuring region.
Figure 4C:
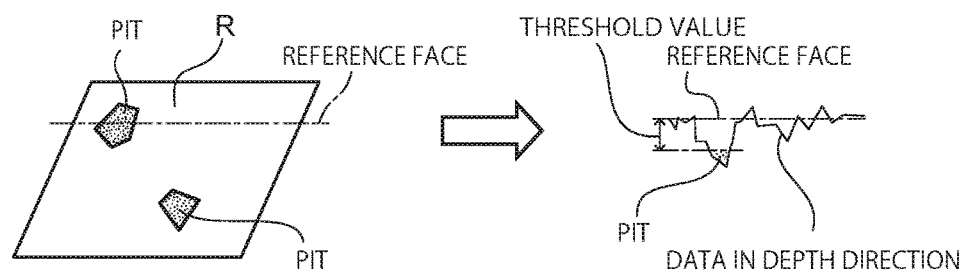
FIG. 4C is a schematic view exemplifying three-dimensional data and a section.

FIGS. 4A to 4C are schematic views for describing the object W and a measuring region R.

FIG. 4A is a schematic perspective view exemplifying the object W having a curved shape. FIG. 4B is a schematic view exemplifying the measuring region R. FIG. 4C is a schematic view exemplifying three-dimensional data and a section.

According to the present embodiment, the shape of the object W having the curved shape, such as an inner wall of a cylinder, illustrated in FIG. 4A, is measured. The light interference optical head 152 measures a distance in a direction vertical to the face of the inner wall S with a predetermined region of the face of the inner wall S as the measuring region R. FIG. 4B schematically illustrates the one measuring region R.

As illustrated in FIG. 4C, the three-dimensional data of the face of the inner wall S includes data of the distance in the direction vertical to the face of the inner wall S (a depth direction) for each pixel of the imaging unit 25 corresponding to the measuring region R. When the face of the inner wall S includes, for example, a pit (a recess) thereon, the data has a value lower than that of a reference face. When the data is lower than a threshold value, the presence of the pit is determined.

(Measurement Method and Measurement Program)

A measurement method according to the present embodiment measures a surface of the object W having the curved shape illustrated in FIG. 4A with, for example, the image measurement apparatus 1 described above.

The measurement method has the following processes.
(1) A process of setting the measuring region R of the object W and the threshold value of concave and convex,
(2) A process of acquiring shape reference data including the curved shape of the object W,
(3) A process of acquiring three-dimensional data of the surface of the object W by measuring a distance between the object W in the measuring region R and the measurement head (the light interference optical head 152),
(4) A process of acquiring curve removed data by removing the shape reference data from the three-dimensional data,
(5) A process of calculating second reference data by calculating first reference data based on the curve removed data, by removing data exceeding the threshold value with respect to the first reference data, from the curve removed data, and by averaging the curve removed data from which the data exceeding the threshold value is removed, and
(6) A process of calculating shape data of the concave and convex by extracting data exceeding the threshold value with respect to the second reference data.

For example, the computer system 20 of the image measurement apparatus 1, or a program executed by a computer that has captured the three-dimensional data acquired by the apparatus body 10 (a measurement program), performs each of the processes (1) to (5). The computer may be included in the computer system 20.

Figure 5:
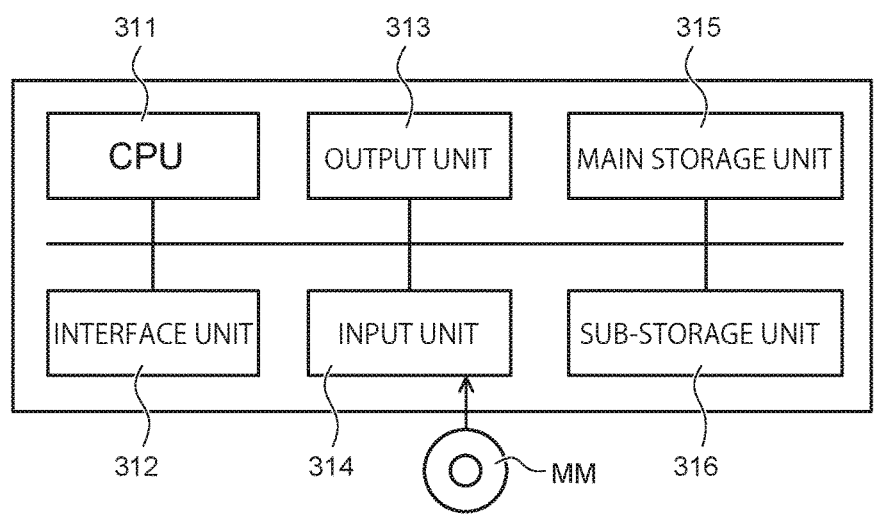
FIG. 5 is a block diagram exemplifying a configuration of a computer.

FIG. 5 is a block diagram exemplifying a configuration of the computer. The computer includes a central processing unit (CPU) 311, an interface unit 312, an output unit 313, an input unit 314, a main storage unit 315, and a sub-storage unit 316.

The CPU 311 controls each of the units by executing various programs. The interface unit 312 inputs and outputs information with respect to external equipment. According to the present embodiment, the computer captures information transmitted from the apparatus body 10, through the interface unit 312. The computer transmits information to the apparatus body 10 through the interface unit 312. The interface unit 312 couples the computer to a local area network (LAN) or a wide area network (WAN).

The output unit 313 outputs a result processed by the computer. For example, the display 205 illustrated in FIG. 1 and a printer are used as the output unit 313. The input unit 314 receives information from the user. For example, a keyboard and a mouse are used as the input unit 314. The input unit 314 includes a function of reading information stored in a recording medium MM.

For example, a random access memory (RAM) is used as the main storage unit 315. The sub-storage unit 316 may be partially used as a part of the main storage unit 315. For example, a hard disk drive (HIM) and a solid state drive (SSD) are used as the sub-storage unit 316. The sub-storage unit 316 may be an external storage device coupled through a network.

Figure 6:
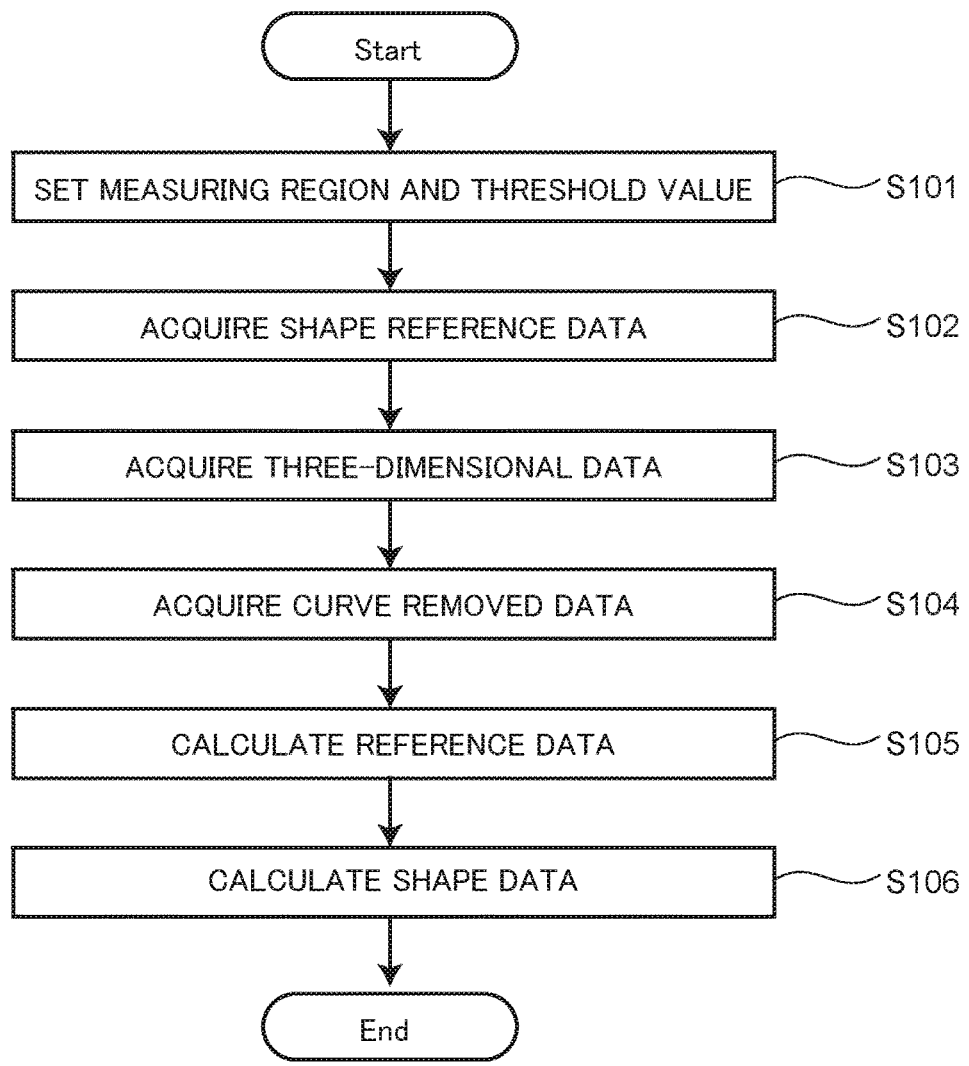
FIG. 6 is a flow chart exemplifying a flow of a measurement program according to the present embodiment.

FIG. 6 is a flow chart exemplifying a flow of the measurement program according to the present embodiment.

The measurement program according to the present embodiment, causes the computer to function as means corresponding to the processes (1) to (6). Pieces of processing at steps S101 to S106 illustrated in FIG. 6 correspond to the processes (1) to (6).

Figure 7A:
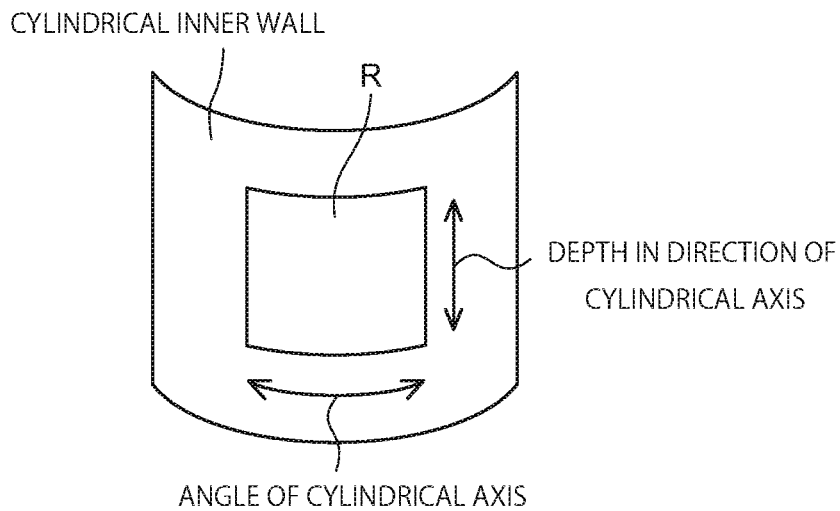
FIG. 7A is a schematic view of a measuring region of a cylindrical inner wall.

First, a measuring region and the threshold value are set as illustrated at step S101. FIG. 7A schematically illustrates the measuring region R of the cylindrical inner wall. The angle of a cylindrical axis and the position of depth in a direction of the cylindrical axis are specified so that the measuring region R of the cylindrical inner wall is set. For example, the threshold value of the depth of the pit is set as a setting for the threshold value of the concave and convex of the cylindrical inner wall.

Figure 7B:
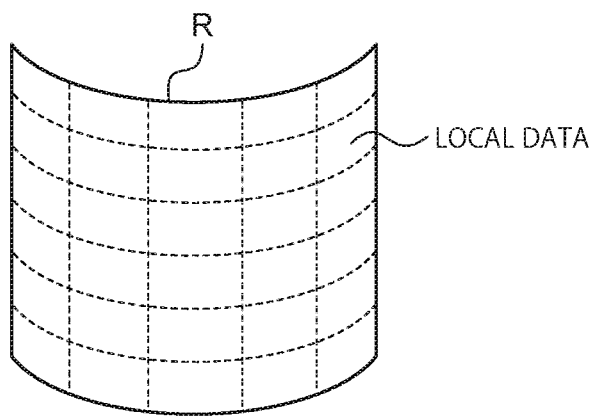
FIG. 7B is a schematic view of the correspondence between the measuring region and at least two pieces of local data on the cylindrical inner wall.

Note that, when the measuring region R exceeds a range that can be measured by scanning once with the measurement head (e.g., the light interference optical head 152), measurement positions of at least two pieces of local data are calculated in order to cover the entirety of the measuring region R. FIG. 7B schematically illustrates the correspondence between the measuring region R and the pieces of local data on the cylindrical inner wall.

Figure 8A:
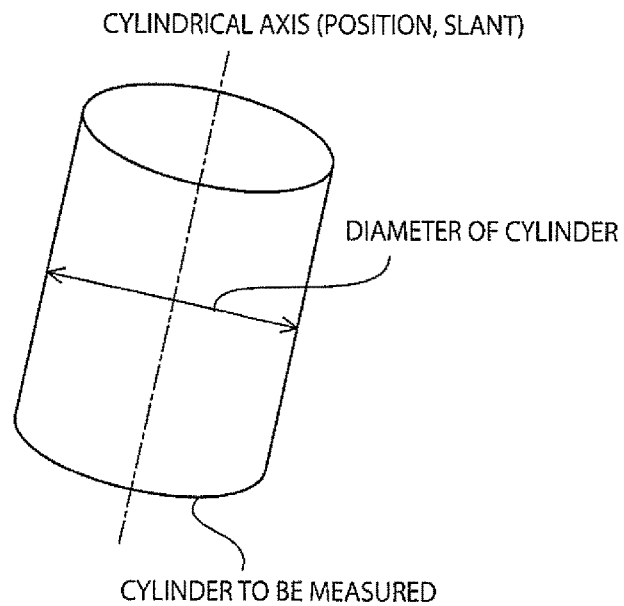
FIGS. 8A and 8B are schematic views exemplifying reference data.

Next, as illustrated at step S102, the shape reference data is acquired. The shape reference data indicates a shape including the curved shape of the object. W. For example, when the object W is the cylindrical inner wall as illustrated in FIG. 8A, the shape reference data includes elements for indicating a cylindrical shape (e.g., the slant of the cylindrical axis and the diameter of the cylinder). According to the present embodiment, the image optical head 151 that has been mounted on the imaging unit 15, captures the image of the object W so as to acquire the shape reference data. When the object W is the cylindrical inner wall, three points at the edge of the cylinder are measured and then data of a circle is calculated so that the diameter of the cylinder is calculated. Data of two circles is calculated in a depth direction so that the slant of the cylindrical axis is calculated with a line with which the centers of the respective circles are connected. Note that, a touch probe may be used, instead of the image optical head 151, in order to acquire the shape reference data.

Next, as illustrated at step S103, the three-dimensional data is acquired. According to the present embodiment, the image optical head 151 is switched to the light interference optical head 152, mounted on the imaging unit 15. Then, the light interference optical head 152 measures the distance between each measurement point in the measuring region R and the measurement head so that the three-dimensional data of the measuring region R is acquired.

Figure 8B:
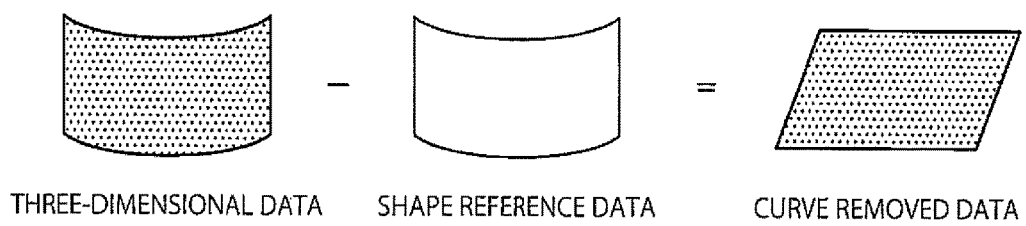

Next, as illustrated at step S104, the curve removed data is acquired. That is, the shape reference data acquired at step S102 is removed from the three-dimensional data of the measuring region R previously acquired at step S103 so that the curve removed data is acquired. Accordingly, a curvature component of the measuring region. R is removed from the three-dimensional data. FIG. 8B schematically illustrates a method of acquiring the curve removed data. The three-dimensional data includes the curvature component of the measuring region R. The shape reference data can be regarded as three-dimensional shape data ideal for the measuring region. The shape reference data is subtracted from the three-dimensional data that has been measured, so that data excluding the the curvature component from a measurement value (the curve removed data), is acquired. The curve removed data is the three-dimensional data of the object W including the curved shape, that has been apparently flattened.

Note that, when the measuring region R includes the at least two pieces of local data, the curve removed data acquired per local data is combined (stitched) together. When an overlapped region occurs in the pieces of local data adjacent to each other in the combination, the overlap is removed. Accordingly, the curve removed data of the entire measuring region R is provided.

Figure 9A:
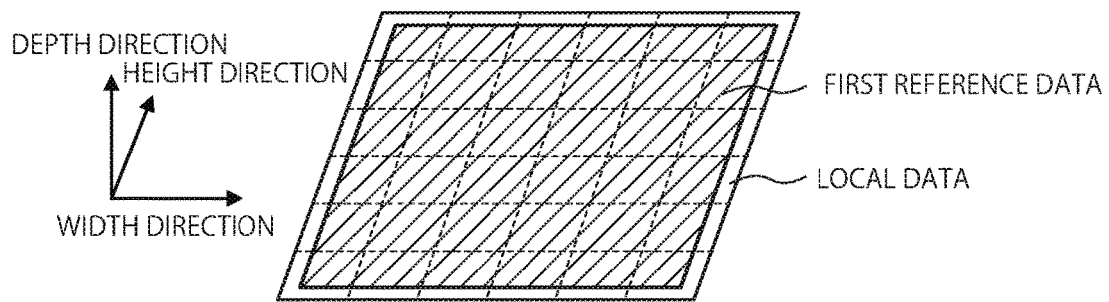
FIGS. 9A and 9B are schematic views exemplifying determination of a pit from reference data.

Next, as illustrated at step S105, reference data is calculated. First, the first reference data based on the curve removed data acquired at step S104, is calculated. The first reference data is the average depth in the group including all the measurement points in the curve removed data. An approximate plane calculated from the curve removed data to which predetermined filtering has been performed, may be used for the first reference data. FIG. 9A schematically illustrates the first reference data calculated from the curve removed data of the measuring region R. The first reference data in the measuring region R is plane data. A direction orthogonal to a face of the first reference data, is a depth direction.

After the calculation of the first reference data, the second reference data is calculated, the second reference data being a value calculated by removing the data exceeding the threshold value (the threshold value of the concave and convex, set at step S101) with respect to the first reference data, from the curve removed data, and by averaging the curve removed data from which the data exceeding the threshold value is removed. The second data is the average value excluding the data determined to be the concave and convex based on the first reference data.

Figure 9B:
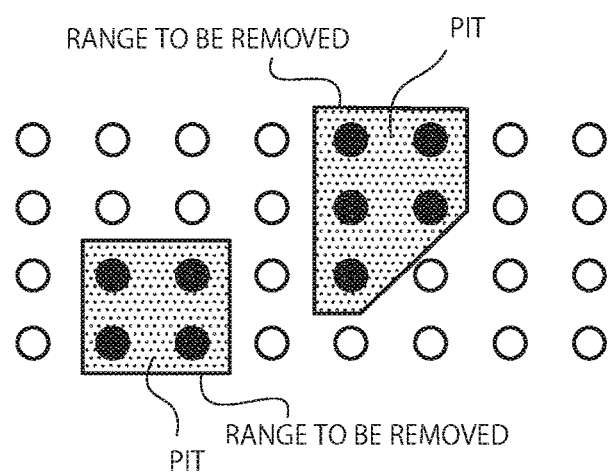

FIG. 9B schematically illustrates the range of the pit to be removed from the first reference data. Here, a range enclosed in a direction of the face (a range including points exceeding the threshold value, successive in the direction of the face), is determined to be the pit in the points having the data exceeding the threshold value with respect to the first reference data (black dots in the figure). Data of the region determined to be the pit, is removed from the curve removed data. The second reference data, which is acquired by averaging data excluding the data of the pit, indicates the reference face without influence of the pit.

Next, as illustrated at step S106, the shape data is calculated. That is, the shape data of the concave and convex is calculated by extracting the data exceeding the threshold value with respect to the second reference data, from the curve removed data. For example, when the pit is determined, a range enclosed in the direction of the face is determined to be the pit in points having the data exceeding the threshold value with respect to the second reference data, as with the determination of the pit described above. By determining the pit, it is possible to calculate the area size, the area ratio, the volume, openings (e.g., a maximum value, a minimum value, and an average value of the openings), of the pit. By using data of a region except the pit, it is possible to calculate the surface roughness.

In this manner, the measurement program according to the present embodiment, can automatically perform the processes (steps S102 to S106) except the setting of the measuring region R and the threshold value illustrated at step S101. Therefore, it is possible to acquire a stable measurement result automatically regardless of a skilled level of an operator.

As described above, according to the present embodiment, when the surface of the curved object W is measured, it is possible to measure the surface automatically and precisely, while the influence of the curved shape and the concave and convex of the surface being inhibited.

Here, the measurement program according to the present embodiment described above, may be stored in the computer-readable recording medium MM. That is, a part of steps S101 to S106 illustrated in FIG. 6 or the entirety may be stored in the recording medium MM in a computer-readable format. The measurement program according to the present embodiment may be distributed through a network.

Note that, the present embodiment has been described above, but the present invention is not limited to the embodiment. For example, the light interference optical head 152 with the white-light interferometry is used as the measurement head, but an image probe or a laser probe can be also applied. Points from focus (PFF) that acquires the three-dimensional shape of the object W by detecting a peak in contrast of each pixel of a CCD from images successively acquired with the image optical head 151, as the measurement head, scanning in the direction of the optical axis of the light with which the object W is irradiated, can be also applied.

According to the present embodiment, the curved surface having the recess (the pit) has been exemplarily described for the measuring object W, but the object to which the embodiment of the present invention can be applied, is not limited to this. For example, the embodiment of the present invention can be applied to the object W being a face of an inner wall of a cylinder, the face having cross-hatching (grooves in a mesh pattern) formed by honing processing. Furthermore, the embodiment of the present invention can deal with the measurement of various curved surfaces, such as a cone, an elliptical cylinder, and an elliptical cone, other than the cylinder, and a plane shape having no curved shape, as the object W. The scope of the present invention also includes additions, deletions, and design alterations of the constituent elements appropriately made with respect to the embodiment described above by a person skilled in the art, and an appropriately combination of the features of the embodiment, as far as the spirit of the present invention is included.

What is claimed is:
1. A method of measuring a surface of an object having a curved shape by measuring a distance from a measurement head to the object, the measurement method comprising:
setting, by a processor, a measuring region of the object and a threshold value of a concave surface and a convex surface of the object, the measurement region being a curved surface of the object scanned by the measurement head;
acquiring, by a camera, three-dimensional shape reference data including the curved shape of the object;
measuring, via the measurement head, the distance between the object in the measuring region and the measurement head;
acquiring, by the processor, three-dimensional data of the surface of the object based on the measured distance;

acquiring, by the processor, curve removed data by removing the three-dimensional shape reference data from the three-dimensional data;

calculating, by the processor, first reference data from the curve removed data;

calculating, by the processor, second reference data by removing data points exceeding the threshold value with respect to the first reference data, from the curve removed data, and by averaging the curve removed data from which the data exceeding the threshold value is removed; and calculating, by the processor, shape data of the concave surface and convex surface by extracting the data exceeding the threshold value with respect to the second reference data, from the curve removed data, wherein the removing of the data points is performed based on depth information of each data point included in the concave surface or the convex surface of the object.

2. The measurement method according to claim 1, further comprising:

calculating, by the processor, roughness of the surface of the object by using data excluding the data exceeding the threshold value with respect to the second reference data, from the curve removed data.

3. The measurement method according to claim 1, wherein the shape data of the concave surface and convex surface includes at least one of the area, the area ratio, the volume, a maximum value of openings, a minimum value of the openings, and an average value of the openings, of the concave surface and convex surface.

4. The measurement method according to claim 1, wherein the surface of the object is an inner face of any of a cylinder, a cone, an elliptical cylinder and an elliptical cone.

5. The measurement method according to claim 1, wherein the measurement head measures the distance by light interferometry.

6. The measurement method according to claim 1, wherein the measuring region is provided on an inner sidewall of the object.

7. A non-transitory computer-readable recording medium that stores a measurement program for measuring a surface state of an object having a curved shape by measuring a distance from a measurement head to the object, when executed by a processor of a computer causes the computer to:

set a measuring region of the object and a threshold value of a concave surface and a convex surface of the object, the measurement region being a curved surface of the object scanned by the measurement head;

acquire, via a camera, three-dimensional shape reference data including the curved shape of the object;

cause a measurement head to measure the distance between the object in the measuring region and the measurement head;

acquire three-dimensional data of the surface of the object based on the measured distance;

acquire curve removed data by removing the three-dimensional shape reference data from the three-dimensional data;

calculate first reference data from the curve removed data;

calculate a second reference data by removing data points exceeding the threshold value with respect to the first reference data, from the curve removed data, and by averaging the curve removed data from which the data exceeding the threshold value is removed; and calculate shape data of the concave surface and convex surface by extracting the data exceeding the threshold value with respect to the second reference data, from the curve removed data, wherein the removing of the data points is performed based on depth information of each data point included in the concave surface or the convex surface of the object.

* * * * *